United States Patent
Chen

(10) Patent No.: US 10,911,819 B2
(45) Date of Patent: Feb. 2, 2021

(54) MULTIMEDIA PIPELINE DEVICE

(71) Applicant: REALTEK SEMICONDUCTOR CORPORATION, Hsinchu (TW)

(72) Inventor: Ching-Lung Chen, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 5 days.

(21) Appl. No.: 16/382,278

(22) Filed: Apr. 12, 2019

(65) Prior Publication Data

US 2019/0356943 A1 Nov. 21, 2019

(30) Foreign Application Priority Data

May 16, 2018 (TW) .............................. 107116528 A

(51) Int. Cl.
*H04N 21/43* (2011.01)
*H04N 21/235* (2011.01)
*G06F 16/48* (2019.01)
*G06F 11/10* (2006.01)

(52) U.S. Cl.
CPC ..... *H04N 21/4307* (2013.01); *G06F 11/1004* (2013.01); *G06F 16/489* (2019.01); *H04N 21/2353* (2013.01)

(58) Field of Classification Search
CPC ............ H04N 21/2353; H04N 21/4307; G06F 11/1004; G06F 16/489
See application file for complete search history.

(56) References Cited

U.S. PATENT DOCUMENTS

| | | | | |
|---|---|---|---|---|
| 8,560,579 | B1* | 10/2013 | Gross | G06F 16/10 707/822 |
| 2001/0023498 | A1* | 9/2001 | Cosmao | H04N 5/782 725/32 |
| 2005/0086566 | A1* | 4/2005 | Thompson | G06F 30/33 714/741 |
| 2008/0256634 | A1* | 10/2008 | Pichler | H04L 63/145 726/23 |
| 2014/0169190 | A1* | 6/2014 | Worrall | H04L 43/50 370/252 |

* cited by examiner

*Primary Examiner* — Dominic D Saltarelli
(74) *Attorney, Agent, or Firm* — WPAT, PC

(57) ABSTRACT

Disclosed is a multimedia pipeline device including first pipeline circuits and a processor. The first pipeline circuits include: a first circuit generating first data according to input data and recording characteristic information of the input data; and a second circuit generating second data according to the first data and recording characteristic information of the first data. The processor determines whether the characteristic information of the input data and the characteristic information of the first data are correct according to first and second prestored information respectively, in which at least a part of the first prestored information is recorded by the first circuit according to verified input data in advance and at least a part of the second prestored information is recorded by the second circuit according to verified first data in advance, and the verified input data and the input data originate from the same multimedia test file.

13 Claims, 4 Drawing Sheets

MULTIMEDIA PIPELINE DEVICE

BACKGROUND OF THE INVENTION

1. Field of the Invention

The present invention relates to a multimedia pipeline device, especially to a multimedia pipeline device capable of automatically checking the correctness of video output and/or audio output.

2. Description of Related Art

In order to process multimedia data, a multimedia apparatus (e.g., a television) usually includes a video pipeline device and an audio pipeline device which are designed to process video data and audio data orderly. However, when designing the above-mentioned pipeline devices, if some features need to be added/modified, some parameters need to be changed, some errors need to be corrected, and so on and so forth, the current techniques rely on human eyes and ears to determine whether the updated video output and audio output are correct. Since human check takes a lot of time and is hard to be accurate, an automatic check technique is needed.

SUMMARY OF THE INVENTION

An object of the present invention is to provide a multimedia pipeline device capable of automatically checking the correctness of video output and/or audio output without human check.

The present invention discloses a multimedia pipeline device. An embodiment of the multimedia pipeline device includes a plurality of first pipeline circuits and a processor. The plurality of first pipeline circuits include a first circuit and a second circuit. The first circuit is configured to generate first data according to input data and record the characteristic information of the input data. The second circuit is configured to generate second data according to the first data and record the characteristic information of the first data. The processor is configured to determine whether the characteristic information of the input data is correct according to the first prestored information, and configured to determine whether the characteristic information of the first data is correct according to the second prestored information, wherein at least a part of the first prestored information is recorded by the first circuit according to verified input data in advance, at least a part of the second prestored information is recorded by the second circuit according to verified first data in advance, the verified first data is generated by the first circuit according to the verified input data, and the verified input data and the input data originate from the same multimedia test file.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this industrial field. If any term is defined in the following description, such term should be explained accordingly.

The present disclosure includes a multimedia pipeline device capable of automatically checking the correctness of video output and/or audio output. The multimedia pipeline device is a video pipeline device, an audio pipeline device, or the combination of the video pipeline device and the audio pipeline device.

Figure 1:
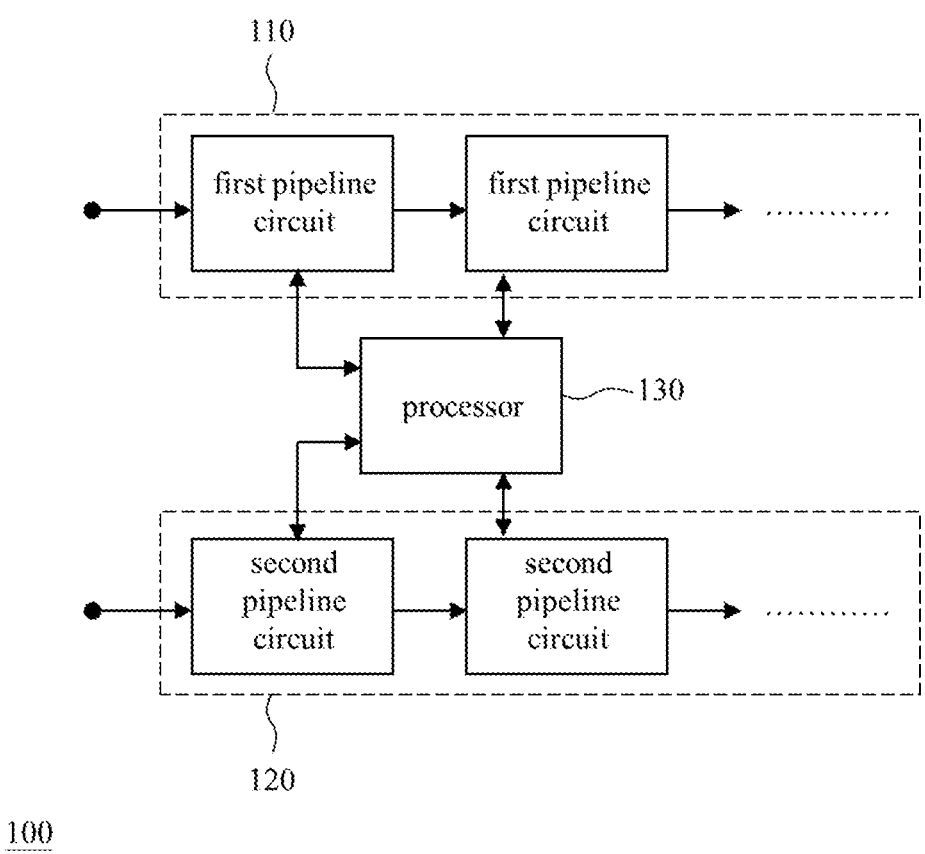
FIG. 1 shows an embodiment of the multimedia pipeline device of the present invention.

FIG. 1 shows an embodiment of the multimedia pipeline device of the present invention. The multimedia pipeline device 100 of FIG. 1 includes a plurality of first pipeline circuits 110, a plurality of second pipeline circuits 120, and a processor 130. The plurality of first pipeline circuits 110 constitutes a video pipeline circuit, and an embodiment of the video pipeline circuit includes a demultiplexer, a video decoder, an Open Media Acceleration (OpenMax) interface, a direct video output (DVO) circuit, a video output direct memory access (VODMA) circuit, a scaler, a picture quality (PQ) circuit, a motion-estimation motion-compensation (MEMC) circuit, a panel interface, etc. Each of the above-mentioned circuits and interface of the video pipeline circuit alone is a known or self-developed circuit. The plurality of second pipeline circuits 120 constitutes an audio pipeline circuit, and an embodiment of the audio pipeline circuit includes a demultiplexer, an audio decoder, an audio output circuit, etc. Each of the above-mentioned circuits of the audio pipeline circuit alone is a known or self-developed circuit. At least two circuits in the plurality of first/second pipeline circuits 110/120 are connected in series; in other words, the plurality of first/second pipeline circuits 110/120 include two adjacent circuits which are composed of a preceding circuit (e.g., the demultiplexer 210 of FIG. 2) and a following circuit (e.g., the video decoder 220 or the audio decoder 230 of FIG. 2), in which the following circuit operates according to the output of the preceding circuit. The processor 130 is a central processing unit (CPU) or the equivalent thereof, and the processor 130 is coupled to at least a part of the plurality of first pipeline circuits 110 and at least a part of the plurality of second pipeline circuits 120. It should be noted that in an alternative embodiment of the present invention, the multimedia pipeline device 100 includes the plurality of first/second pipeline circuits 110/120 without including the plurality of second/first pipeline circuits 120/110; in other words, the multimedia pipeline device 100 is a pure video pipeline device or a pure audio pipeline device.

Figure 2:
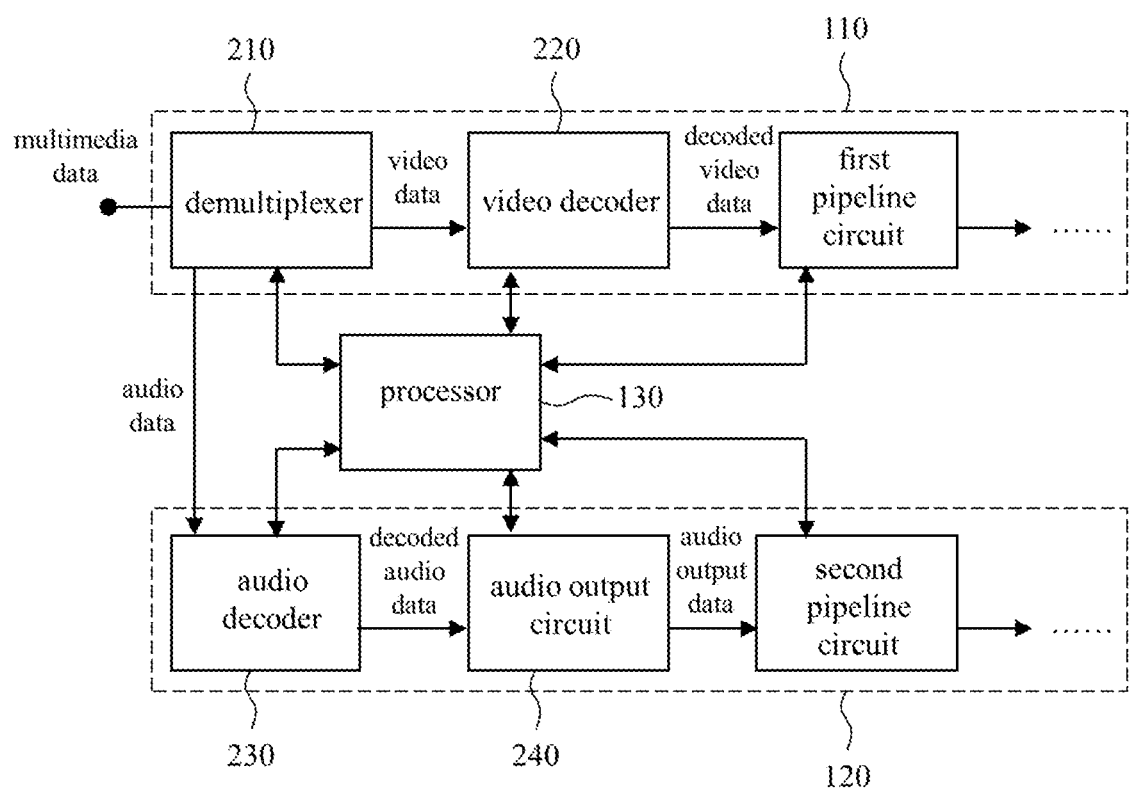
FIG. 2 shows an exemplary implementation of FIG. 1.

FIG. 2 shows an exemplary implementation of FIG. 1. The plurality of first pipeline circuits 110 include a demultiplexer 210, a video decoder 220, and the rest of the plurality of first pipeline circuits 110, in which the plurality of first pipeline circuits 110 and the plurality of second pipeline circuits 120 share the demultiplexer 210 so that the demultiplexer 210 can be deemed one of the plurality of second pipeline circuits 120. The plurality of second pipeline circuits 120 include an audio decoder 230 and an audio output circuit 240, and include the rest of the plurality of second pipeline circuits 120, if any. Each circuit (or some circuit(s)) of the plurality of first pipeline circuits 110 and the plurality of second pipeline circuits 120 is configured to generate the characteristic information of data the circuit receives; the characteristic information is outputted to the processor 130 for the execution of a comparison process or a correctness test so that the processor 130 can output a result indicating whether the data transmission or the data processing is abnormal. For instance, the demultiplexer 210 is configured to receive multimedia data and generate video data and audio data according to the multimedia data respectively, and configured to record the characteristic information of the multimedia data; the video decoder 220 is configured to generate decoded video data according to the video data and record the characteristic information of the video data; the audio decoder 230 is configured to generate decoded audio data according to the audio data and record the characteristic information of the audio data; and the audio output circuit 240 is configured to generate audio output data according to the decoded audio data and record the characteristic information of the decoded audio data. A non-restrictive example of each of the above-mentioned characteristic information includes at least one of the following information known in this industrial field: a cyclic redundancy check (CRC) value; a checksum; an arrival time (e.g., a frame arrival time); a departure time (e.g., a frame departure time); video parameter setting/audio output data setting (e.g., sampling rate, sample format, channel count); and a presentation time stamp (PTS). A non-restrictive example of the above-mentioned video parameter setting includes at least one of the following information known in this industrial field: a frame width; a frame height; a frame rate; a frame number; a total frame number; a frame associated with metadata; and a scan type.

Figure 3:
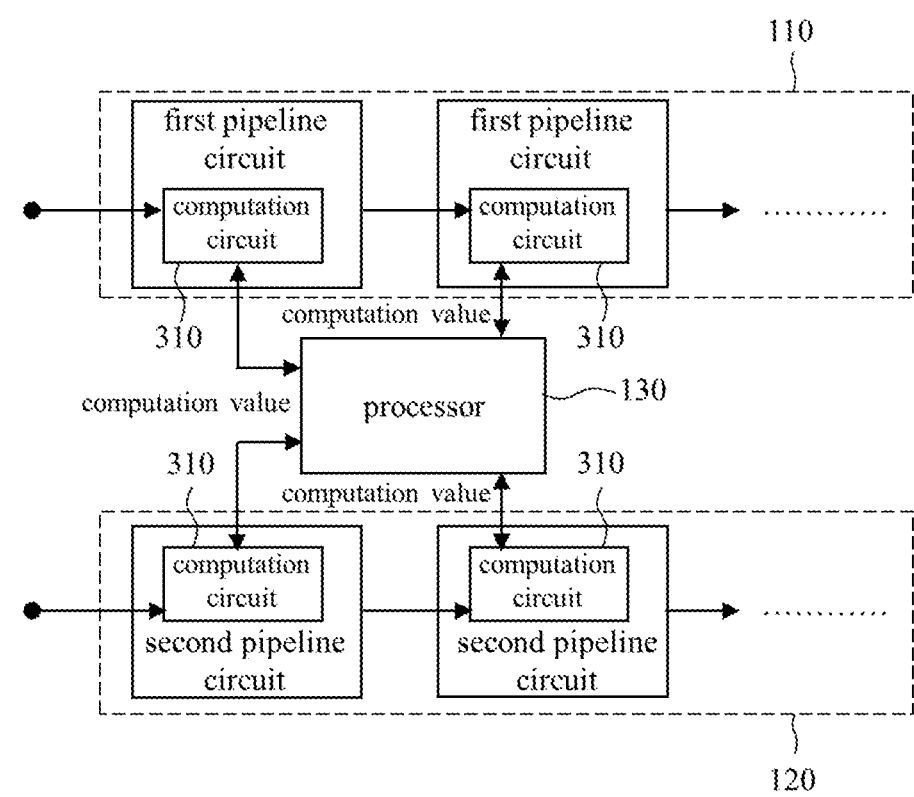
FIG. 3 shows another exemplary implementation of FIG. 1.

Since each circuit of the plurality of first pipeline circuits 110 and the plurality of second pipeline circuits 120 may include one or more subsidiary circuits while each subsidiary circuit could be the stage causing a test to fail, each subsidiary circuit may generate characteristic information in the aforementioned manner and output the characteristic information to the processor 130 for check. In addition, the generation of the aforementioned CRC value or the checksum may require a lot of computation resource, if each circuit (or each subsidiary circuit) of the plurality of first pipeline circuits 110 and the plurality of second pipeline circuits 120 individually asks the processor 130 to generate a CRC value or a checksum, the processor 130 may be unable to respond in time. In consideration of the above concern, each circuit (or each subsidiary circuit) of the plurality of first pipeline circuits 110 and the plurality of second pipeline circuits 120 can optionally include one or more computation circuits 310 as shown in FIG. 3, and each computation circuit 310 is configured to generate a computation value as a CRC value or a checksum according to reception data the computation circuit 310 receives so as to relieve the burden of the processor 130 or increase the performance of the present invention. Each computation circuit 310 can be designed to process the reception data according to a predetermined algorithm (e.g., a CRC algorithm) to generate the computation value, in which the data amount of the computation value (e.g., 4 bytes) is far less than the data amount of the reception data (e.g., the data amount (3840×2160×3=24883200 bytes) of a 4K resolution video frame in compliance with a YUV 444 format) and thus the processor 130 can execute a comparison process or a correctness test process according to the computation value rapidly. Each computation circuit 310 can be a self-developed or known circuit such as a known CRC value generating circuit.

Figure 4:
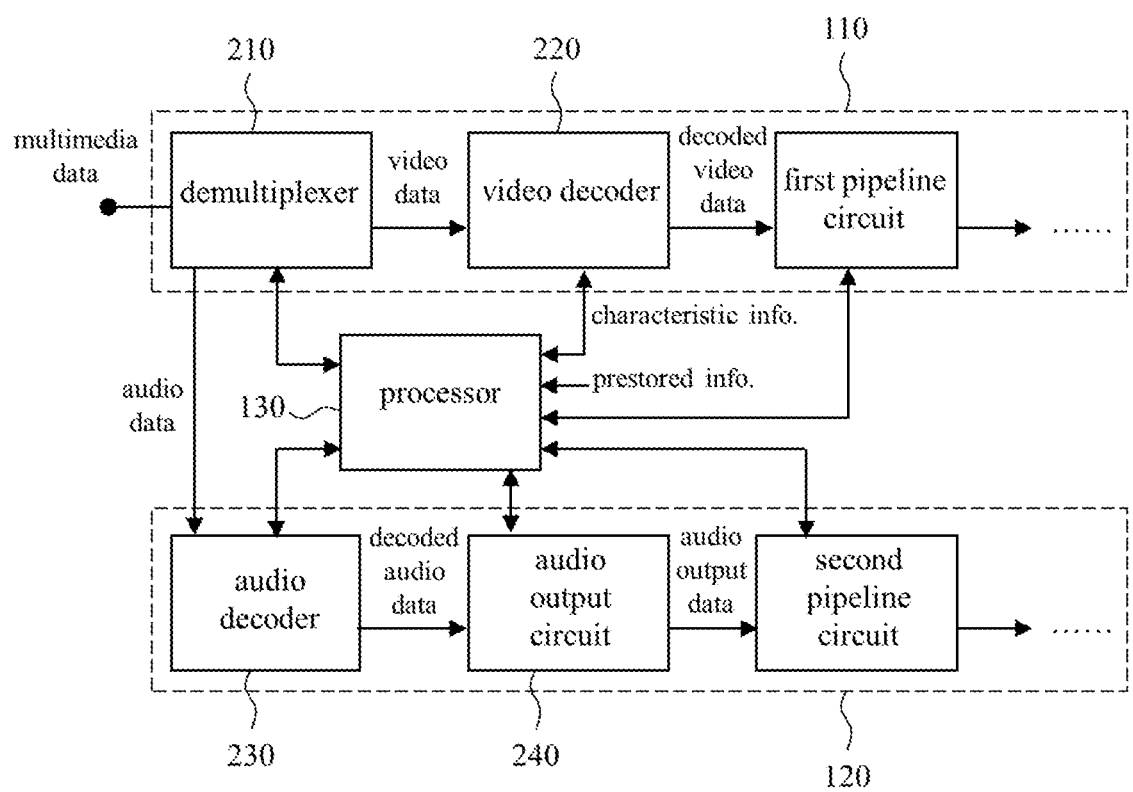
FIG. 4 shows yet another exemplary implementation of FIG. 1.

Please refer to FIG. 1. The processor 130 is configured to determine whether the characteristic information recorded by each circuit of the plurality of first pipeline circuits 110 and the plurality of second pipeline circuits 120 is correct in accordance with prestored information. In an exemplary implementation as shown in FIG. 4, the processor 130 determines whether the characteristic information of video data recorded by the video decoder 220 is correct according to prestored information. In detail, the processor 130 compares the time-unrelated data (e.g., a prestored CRC value or checksum) of the prestored information with the time-unrelated data (e.g., a CRC value or checksum recorded by the video decoder 220) of the characteristic information of the video data and thereby determines that the time-unrelated data of the video data is correct when the result of the comparison shows the time-unrelated data of the prestored information is equivalent to the time-unrelated data of the characteristic information of the video data. The processor 130 further determines whether the video data is correct according to the time-related data (e.g., the aforementioned frame rate, frame number, arrival time) of the characteristic information of the video data; for instance, the processor 130 determines whether the interval between frames of the video data is within a predetermined range according to the frame rate, determines whether the frame numbers of two consecutive frames of the video data are discontinuous or repeating, and determines whether the arrival time of a frame of the video data falls within the interval between two consecutive frames. Accordingly, the processor 130 can determine whether each characteristic information of the video data is correct in the above-mentioned manner. In a similar manner, the processor 130 can determine whether the characteristic information of the other data (e.g., the aforementioned characteristic information of the multimedia data, characteristic information of audio data, characteristic information of decoded audio data, and other characteristic information generated by other pipeline circuits) is correct. In another exemplary implementation, the processor 130 compares the characteristic information (e.g., video parameter setting/audio output data setting) recorded by one first/second pipeline circuit 110/120 with the characteristic information (e.g., video parameter setting/audio output data setting) recorded by another first/second pipeline circuit 110/120 while the two pieces of characteristic information are associated with the same frame number, and thereby the processor 130 determines that the test of the above-mentioned comparison passes if the two pieces of characteristic information are equivalent. In yet another exemplary implementation, the processor 130 is configured to determine whether the relation between the characteristic information recorded by a certain first pipeline circuit 110 (e.g., video decoder 220) and the characteristic information recorded by a certain second pipeline circuit 120 (e.g., audio decoder 230) conforms to a predetermined relation; for instance, by inputting specific video data to the multimedia pipeline device 100, the frames of the decoded video data can be a black frame, a black frame, a white frame, a black frame, a black frame, a white frame, and so on and so forth while the sounds of the decoded audio data can be silent, silent, a buzz, silent, silent, a buzz, and so on and so forth, and since different frames are associated with different characteristic information and different sounds are associated with different characteristic information as well, the processor 130 can determine whether the relation between the frames and the sounds conforms to the predetermined relation (i.e., a white frame corresponding to a buzz). If the processor 130 determines that all characteristic information is correct, the processor 130 will output a result indicating that the video output and/or the audio output are/is correct; if the processor 130 determines that one or more pieces of characteristic information are incorrect, the processor 130 will output a result indicating the one or more pieces of characteristic information recorded by one or more pipeline circuits are incorrect. As a result, the test results about changed/added features, changed parameters, corrected errors, etc. can be obtained rapidly without human check.

It should be noted that the time-unrelated data of the aforementioned prestored information are the time-unrelated data recorded by the video decoder 220 according to verified video data in advance, in which the verified video data and the video data received by the video decoder 220 originate from the same multimedia test file and should be identical; similarly, the time-unrelated data of the prestored information used by any of the other pipeline circuits is the time-unrelated data recorded by the same pipeline circuit according to verified data in advance, and the verified data and the data received by the pipeline circuit originate from the same multimedia test file. An example of the multimedia test file includes at least one of the following data: multiple video data of different resolutions; multiple video data of different frame rates; multiple video data of different film modes; multiple video data of different dynamic ranges (e.g., high dynamic range (HDR) and standard dynamic range (SDR)); and audio and video synchronization pattern data (e.g., the aforementioned specific video data).

The aforementioned prestored information can be generated by the following steps:

Step 1: designing a pattern of a test file. For instance, this step has the test file include multiple video data of different resolutions, multiple video data of different frame rates, multiple video data of different film modes, multiple video data of different dynamic ranges, and audio and video synchronization pattern data.

Step 2: having the multimedia pipeline device 100 execute the test file so as to have each circuit (or some circuit(s)) of the multimedia pipeline device 100 (e.g., all of the aforementioned first pipeline circuits 110 and second pipeline circuits 120) record the characteristic information of the data the circuit receives.

Step 3: having the multimedia pipeline device 100 execute the test file many times (e.g., more than 100 times) in a manner of manual operation and determining whether the video output and the audio output of the multimedia video pipeline 100 is correct so as to verify that the outputted characteristic information is unchanged each time. For instance, as described in the preceding paragraph, step 3 can take the firstly outputted characteristic information as the basis and thereby verify whether the other outputted characteristic information is the same.

Step 4: when determining the video output and the audio output are correct, using the test file as the aforementioned multimedia test file, in which the data included in the test file are treated as the aforementioned verified data, the characteristic information recorded by the multimedia pipeline device 100 in step 2 is treated as the aforementioned prestored information which can be stored in the pipeline circuits respectively or in a storage circuit (e.g., DRAM/SRAM) the processor 130 can access.

It should be noted that people of ordinary skill in the art can implement the present invention by selectively using some or all of the features of any embodiment in this specification or selectively using some or all of the features of multiple embodiments in this specification as long as such implementation is practicable, which implies that the present invention can be carried out flexibly.

To sum up, the present invention can automatically check the correctness of video output and/or audio output without human check.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A multimedia pipeline device configured to execute a multimedia test file, comprising:
    a plurality of first pipeline circuits including:
        a first circuit configured to generate first data according to input data of the multimedia test file and record current characteristic information of the input data; and
        a second circuit configured to generate second data according to the first data and record current characteristic information of the first data; and
    a processor configured to determine whether the current characteristic information of the input data is correct according to first prestored information, and configured to determine whether the current characteristic information of the first data is correct according to second prestored information, in which at least a part of the first prestored information and at least a part of the second prestored information are recorded during the multimedia pipeline device executing a test file before the test file is used as the multimedia test file,
    wherein after all outputs generated by the multimedia pipeline device executing the test file are determined correct, the test file is then used as the multimedia test file; when the test file is used as the multimedia test file, unverified input data included in the test file and inputted to the first circuit is treated as the input data of the multimedia test file; when the test file is used as the multimedia test file, unverified first data generated by the first circuit according to the unverified input data is treated as verified first data; before the test file is used as the multimedia test file, at least a part of the first prestored information is recorded by the first circuit processing the unverified input data that is treated as the input data of the multimedia test file after the test file is used as the multimedia test file; and before the test file is used as the multimedia test file, at least a part of the second prestored information is recorded by the second circuit processing the unverified first data that is treated as the verified first data after the test file is used as the multimedia test file.

2. The multimedia pipeline device of claim 1, wherein the input data includes video data and audio data, the first circuit is a demultiplexer, the second circuit is a video decoder when the first data is the video data, and the second circuit is an audio decoder when the first data is the audio data.

3. The multimedia pipeline device of claim 1, wherein both the input data and the first data are video data or audio data.

4. The multimedia pipeline device of claim 1, wherein each of the characteristic information of the input data and the characteristic information of the first data includes at least one of following information: a cyclic redundancy check (CRC) value; a checksum; an arrival time; a departure time; video parameter setting; and a presentation time stamp (PTS).

5. The multimedia pipeline device of claim 4, wherein the video parameter setting includes at least one of following information: a frame width; a frame height; a frame rate; a frame number; a total frame number; a frame associated with metadata; and a scan type.

6. The multimedia pipeline device of claim 4, wherein each of the characteristic information of the input data and the characteristic information of the first data includes a computation value, the computation value is one of the CRC value and the checksum, and the plurality of first pipeline circuits includes:
 a computing circuit configured to process the input data according to a predetermined algorithm to generate the computation value, in which a data amount of the computation value is less than a data amount of the input data.

7. The multimedia pipeline device of claim 6, wherein the data amount of the computation value is less than one ten-thousandth of the data amount of the input data.

8. The multimedia pipeline device of claim 1, wherein the first circuit is a demultiplexer, the second circuit is a video decoder, the second data is video data, and the demultiplexer generates audio data according to the input data.

9. The multimedia pipeline device of claim 8, further comprising at least one second pipeline circuit including an audio decoder, wherein the audio decoder is configured to receive the audio data and record characteristic information of the audio data, and the processor is further configured to determine whether a relation between characteristic information of the video data and the characteristic information of the audio data conforms to a predetermined relation.

10. The multimedia pipeline device of claim 9, wherein the processor is configured to determine whether the characteristic information of the audio data is correct according to third prestored information.

11. The multimedia pipeline device of claim 10, wherein the characteristic information of the audio data includes at least one of following information: a cyclic redundancy check value; a checksum; an arrival time; a departure time; audio output data setting; and a presentation time stamp.

12. The multimedia pipeline device of claim 1, wherein the processor is further configured to determine whether parameter setting of the characteristic information of the input data is identical to parameter setting of the characteristic information of the first data while the parameter setting of the characteristic information of the input data and the parameter setting of the characteristic information of the first data are associated with a same frame number.

13. The multimedia pipeline device of claim 1, wherein the same multimedia test file includes at least one of following data: multiple video data of different resolutions; multiple video data of different frame rates; multiple video data of different film modes; multiple video data of different dynamic ranges; and audio and video synchronization pattern data.

* * * * *